United States Patent [19]

Irikura et al.

[11] Patent Number: 4,779,475

[45] Date of Patent: Oct. 25, 1988

[54] KEY-SHIFT TRANSMISSION

[75] Inventors: Koji Irikura, Nishinomiya; Hideaki Okada, Takarazuka, both of Japan

[73] Assignee: Kanzaki Kokyukoki Mfg. Co., Ltd., Amagasaki, Japan

[21] Appl. No.: 126,239

[22] Filed: Nov. 27, 1987

[30] Foreign Application Priority Data

Dec. 22, 1986 [JP] Japan .............................. 61-197071[U]

[51] Int. Cl.$^4$ ............................................. F16H 3/08
[52] U.S. Cl. ........................................ 74/371; 192/71; 192/48.91
[58] Field of Search ............... 74/371, 372; 192/48.9, 192/48.91, 71, 99 B

[56] References Cited

U.S. PATENT DOCUMENTS

| | | | |
|---|---|---|---|
| 2,395,433 | 2/1946 | Sundt | 74/337.5 |
| 3,028,763 | 4/1962 | Vetsch | 74/371 |
| 4,702,120 | 10/1987 | Okada et al. | 74/371 |

FOREIGN PATENT DOCUMENTS

| | | | |
|---|---|---|---|
| 376640 | 10/1907 | France | 74/371 |
| 60-65453 | 5/1985 | Japan . | |
| 61-135047 | 8/1986 | Japan . | |
| 21262 | of 1910 | United Kingdom | 74/371 |

Primary Examiner—Dirk Wright

[57] ABSTRACT

In a transmission comprising a plurality of freely rotatable gears ($11F_1$–$11F_6$) on a transmission shaft (10), each of shift keys (13) slidably disposed within the shaft is connected pivotally to a shift collar (14) using a pin (15). The collar includes a diameter-reduced cylindrical extension (18) having therein slots (18a) through which base end projections (17) of the keys extend radially outwardly of the shaft. The shift keys are biased to pivot for a selective gear-coupling operation by coned disk springs (19) which are disposed on the cylindrical extension and between the collar and the projections.

The disk springs (19) which do not require an enlargement of the outer diameter of shift collar (14) effect a large biasing force upon shift keys (13) for the gear-coupling operation. Further, the disk springs mounted on the cylindrical extension (18) do not cause, when the collar is shifted, a rubbing engagement with the shaft (10) so that a lightness of the shifting operation is assured.

5 Claims, 3 Drawing Sheets

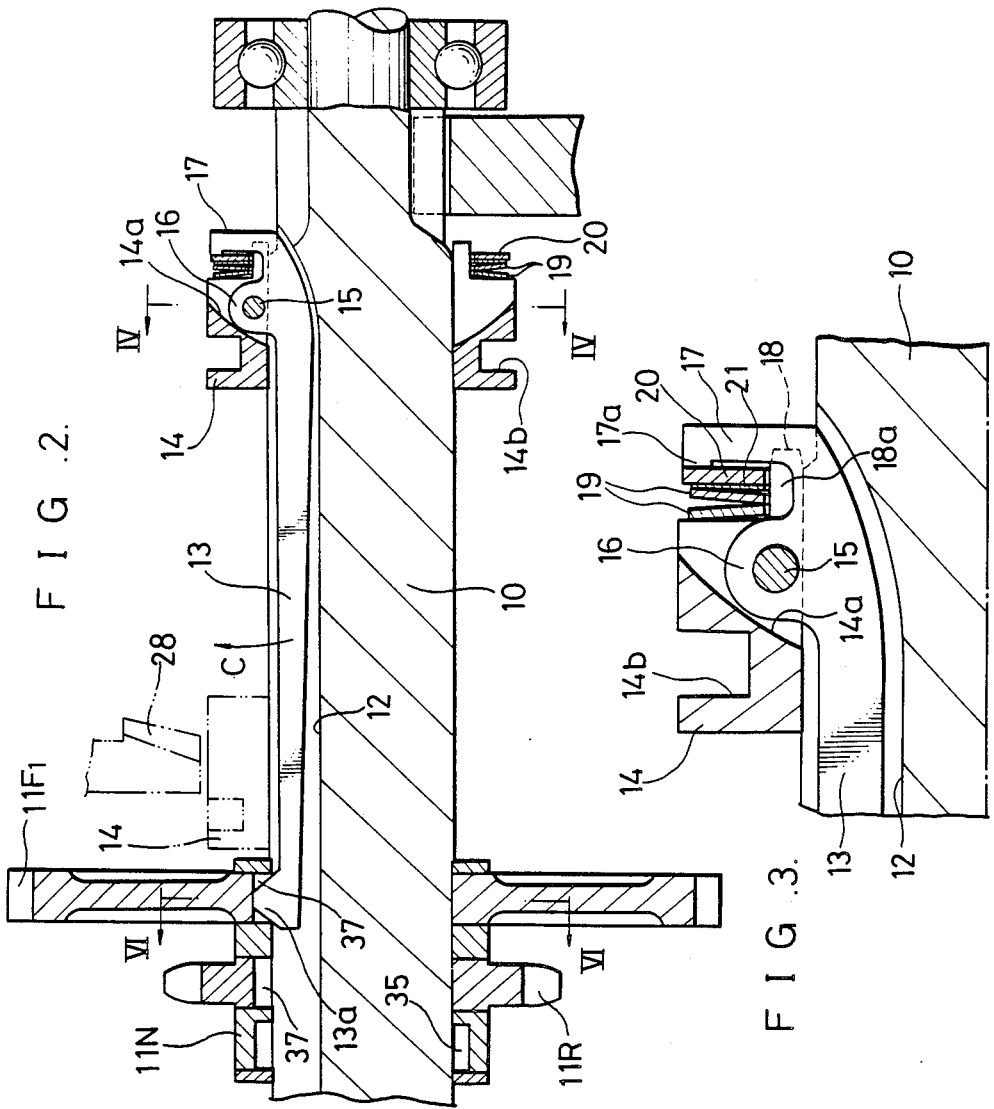

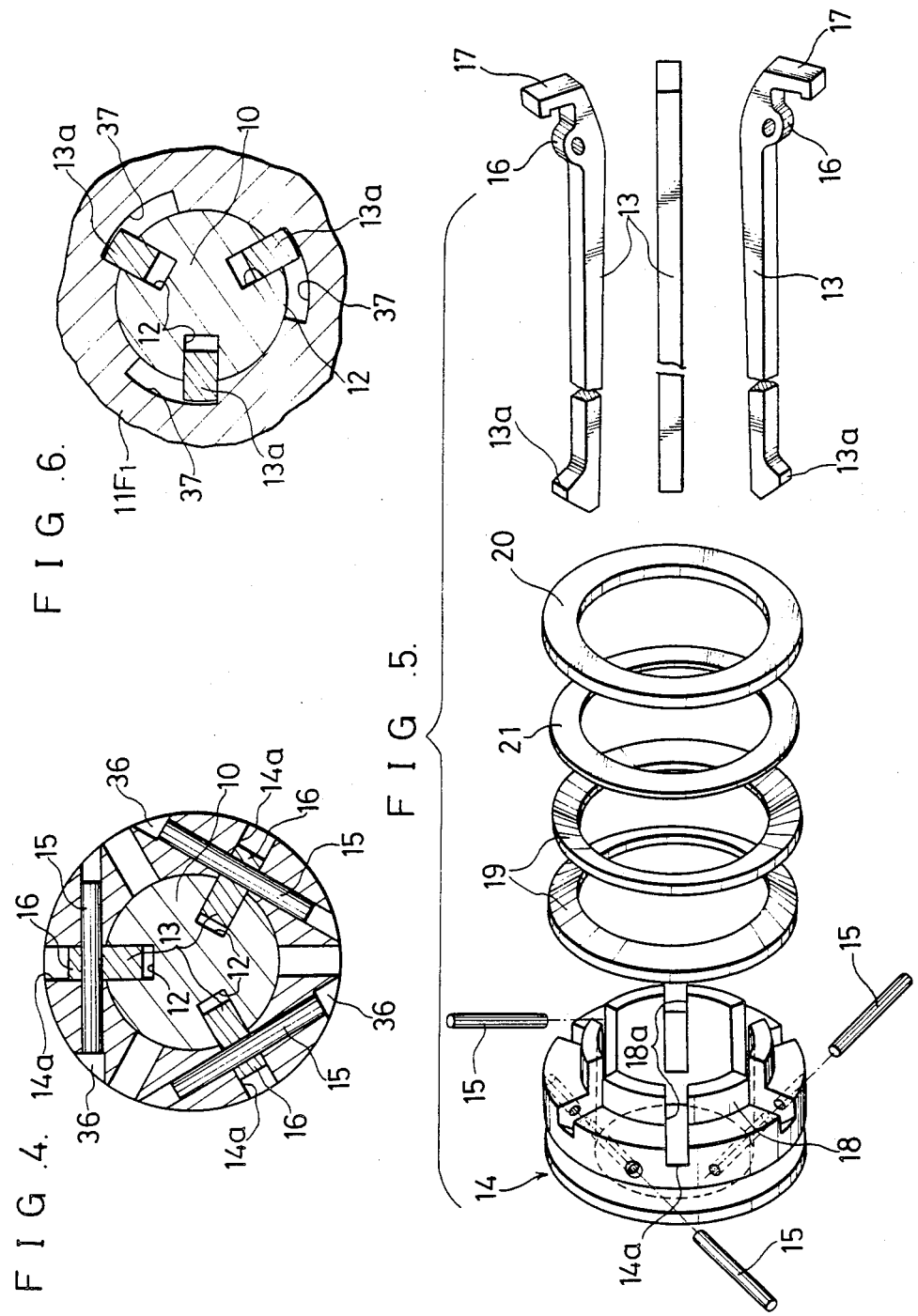

KEY-SHIFT TRANSMISSION

FIELD OF THE INVENTION

This invention relates to a transmission for use in, for example, speed-change purposes of small-sized working vehicles such as mower tractors.

More particularly, the present invention relates to a key-shift transmission in which a plurality of change gears freely rotatable on a transmission shaft are coupled one at a time to such shaft by slidable shift keys each having a gear-engaging lug.

BACKGROUND OF THE INVENTION

From JP, A(U) (Japanese Utility Model Publication under Art. 13 bis of the Japanese Utility Model Law) No. 60-65453 and JP, A(U) No.61-135047, there is known a key-shift transmission in which shift keys slidably disposed within elongated axial grooves in the outter surface of a transmission shaft are connected by pins rotatably to a shift collar, slidably mounted on a transmission shaft for shifting the shift keys axially of the shaft, and are biased by compression coil springs accomodated within the shift collar to rotate towards a direction such that gear-engaging lugs of the keys are projected radially outwardly of the transmission shaft.

As compared to a structure known from, for example, U.S. Pat. Nos. 2,395,433 and 3,028,763 that a leaf spring affixed at one end thereof to a shift key is provided for biasing the key within a key-receiving axial groove in the outer surface of a transmission shaft, each of the shift keys employed in the key-shift transmission referred to above may be enlarged in thickness in the radial direction of transmission shaft so as to enlarge strength of the key. This is because compression coil springs disposed outside the axial grooves in a transmission shaft does not require a reduction of thickness of the shift key.

Of the Japanese Utility Model Publications referred to above, JP, A(U) No. 60-65453 discloses a transmission in which key-biasing compression coil springs are accomodated within a shift collar in a posture such that the coil springs extend radially of the shift collar. Contrarily to this, compression coil springs employed in the transmission shown in JP, A(U) No. 61-135047 are disposed within a shift collar so as to extend axially of the collar so that the coil springs do not require so much an enlargement of the outer diameter of a shift collar for disposing the springs within the collar.

However, a large biasing force is required for shift keys which operate to couple speed-change gears to a transmission shaft in a speed-change mechanism for vehicle. It is considered that the structure shown in JP, A(U) No. 61-135047 will also require a considerable enlargement of the outer diameter of a shift collar for locating pivot pins for the shift keys at radial positions where the interval between each pivot pin and a spring-acting point to each key is large enough for securing a required key-biasing force from the compression coil springs employed. Such enlargement of the outer diameter of a shift collar which rotates in unison with a transmission shaft will provide limitations to the arrangement of transmission members so that compactness of the transmission is impeded.

OBJECTS

Accordingly, an object of the present invention is to provide a novel key-shift transmission in which coned disk spring means providing a large biasing force to shift keys, connected pivotally to a shift collar using pins, is disposed outside key-receiving axial grooves in a transmission shaft without enlarging the outer diameter of shift collar.

A further object of the present invention is to provide a key-shift transmission in which the disk spring means referred to above is provided so as to assure a lightness of the speed-changing operation.

BRIEF DESCRIPTION OF THE DRAWINGS

In the accompanying drawings,

FIG. 2 is a sectional front view of a part of a key-shift transmission shown in FIG. 1;

FIG. 3 is an enlarged view of a part of FIG. 2;

FIG. 4 is a sectional view taken along line IV—IV of FIG. 2;

FIG. 5 is a perspective view, showing some members employed in the embodiment shown; and FIG. 6 is a sectional view taken along line VI—VI of FIG. 2.

SUMMARY OF THE INVENTION

Figure 1:
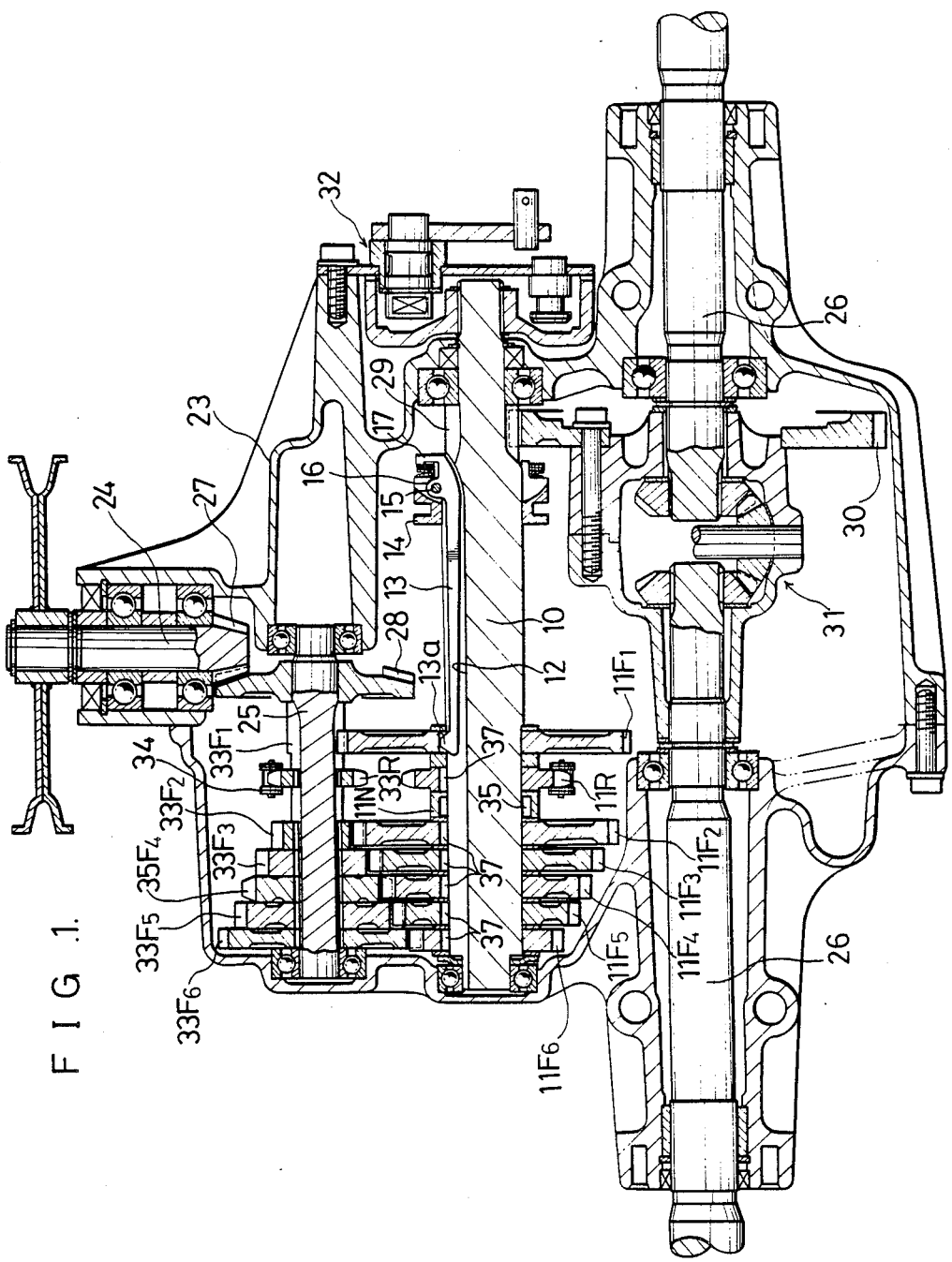
FIG. 1 is a sectional front view, partially developed, of a transmission casing of a working vehicle in which an embodiment of the present invention is employed.

The present invention relates to a key-shift transmission which, as depicted in FIG. 1, comprises:

a transmission shaft 10 having at its outer surface elongated axial grooves 12;

a plurality of axially spaced speed-change gears $11F_1$, $11F_2$, $11F_3$, $11F_4$, $11F_5$ and $11F_6$ rotatably mounted on the transmission shaft 10;

shift keys 13 slidably disposed within the axial grooves 12 and having at free ends thereof gear-engaging lugs 13a. for coupling the speed-change gears $11F_1$–$11F_6$ one at a time to the transmission shaft 10; and a shift collar 14 slidably mounted on the transmission shaft 10 for shifting the shift keys 13 axially of the shaft.

Each of the shift keys 13 is connected at a base end portion thereof to the shift collar 14 by a pin 15 rotatably along a direction such that the gear-engaging lug 13a thereof is moved radially of the transmission shaft 10.

As clearly shown in FIGS. 2 and 3, each of the shift keys 13 is formed at the base end portion thereof, according to the present invention, with an axially spaced shorter first projection 16 and taller second projection 17 both of which extend radially outwardly of the transmission shaft 10. The first projection 16 is received in a slot 14a formed to the shift collar 14 and is connected to such collar 14 by the pin 15 set forth above, whereas the second projection 17 is faced to the shift collar 14 from a direction opposite to the gear-engaging lug 13a.

As shown in FIGS. 3 to 5, the shift collar 14 is formed integrally, according to the present invention, with a diameter-reduced cylindrical portion 18 extending axially towards the second projection 17 and including a slot 18a which is continuous with the slot 14a so as to permit the base end portion of each shift key 13 to pass therethrough. Further, coned disk spring means 19 is disposed on the cylindrical portion 18 and between the shift collar 14 and second projection 17 so as to bias each shift key 13 to rotate towards a direction such that the gear-engaging lug 13a is projected radially outwardly of the transmission shaft 10.

The second projection 17 shown extends radially outwardly of the transmission shaft 10 to a radial position substantially equal to that of the outer circumference of shift key 14. The disk spring means shown is composed of two disk-shaped leaf springs 19 one of which is received by an outer end portion of the shift collar 14 and the other of which is received by an outer end portion of the second projection 17.

The second projection 17 shown is further fashioned to include at its outer end portion a protrusion 17a which is directed towards the shift collar 14. The disk spring means shown is received by such protrusion 17a through a ring 20 which is disposed on the cylindrical portion 18 and between the disk springs and second projection 17. A shim 21 is interposed between the disk springs and ring 20 for adjusting the biasing force of disk spring means shown.

The disk spring means employed in the key-shift transmission according to the present invention acts to pressingly push the second projection 17 on the base end of each shift key 13 so as to bias the key to rotate about the pin 15 towards a direction of arrow C shown in FIG. 2, namely towards a direction such that the key-engaging lug 13a is projected outwardly of the transmission shaft 10 so as to engage to each of the speed-change gears $11F_1$–$11F_6$.

Consequently, when the shift collar 14 is moved along the transmission shaft to a position where the gear-engaging lugs 13a of shift keys 13 moving in unison with the collar is placed at an axial position of any one of the speed-change gears $11F_1$–$11F_6$, gear-engaging lugs 13a engage to such one gear tightly under a large biasing force of the disk springs 19 so that such speed-change gear is coupled tightly to the shaft 10. The taller second projection 17 projects outwardly still from a radial position where the pin 15 pivotally supports the key 13 at the shorter first projection 16 on the key. Such second projection 17 permits to utilize the full of the outer diameter of shift collar 14 in a fashion such that the disk springs 19 are received by respective outer end portions of the collar 14 and second projection 17 so as to highten the biasing force acting upon the shift key 13. A change gear coupled tightly to the transmission shaft 10 transmits torque to the shaft in a stable manner. The key-shift transmission according to the present invention may thus be fashioned such that, while a compactness of the transmission is assured, a stable transmission of torque is attained.

Disk springs 19 disposed or mounted on the diameter-reduced cylindrical extension 18 of shift collar 14 do not cause, when the collar is shifted, a rubbing engagement with the transmission shaft 10, that might be caused if such disk springs were mounted directly on the transmission shaft. Consequently, disk springs 19 will provide no resistance against a speed-changing operation so that a lightness of the operation is assured.

In the transmission shown, shift keys 13 are disposed within the elongated axial grooves 12 in the transmission shaft 10 in a fashion such that the keys are kept apart from bottom surfaces of the axial grooves. Consequently, the shift keys 13 will not cause a sliding engagement with the bottom surfaces of grooves 12 during a shifting operation so that lightness of the operation is further enhanced.

When shift key 13 rotates about the pin 15, posture of the second projection 17 is changed. However, the disk springs 19 act upon such second projection 17 through the axially extending protrusion 17a on an outer end portion of the second projection so that no substantial change in biasing force acting upon the shift key 13 is caused by such change of the posture of second projection 17. The ring 20, through which disk springs 19 act upon the second projection 17, contributes to keep forceacting direction to the second projection substantially same during a shifting operation so as to prevent the shift keys 13 from being shaked.

DESCRIPTION OF A PREFERRED EMBODIMENT

In FIG. 1, numeral 23 designates a transmission casing to be mounted on a small-sized working vehicle in which a preferred embodiment of the present invention is employed.

Within the casing 23 are rotatably arranged an input shaft 24 having one end extending outwardly of the casing, a drive shaft 25 and the transmission shaft 10, referred to before, each of which extends perpendicularly to the input shaft 24 and along a direction across the vehicle, and coaxially disposed left and right wheel axles 26 which extend parallel with the drive and transmission shafts and outwardly of the casing 23. The input shaft 24 is powered by engine (not shown). Left and right rear wheels (not shown) of the vehicle are attached to the outer ends of the left and right axles 26. Within the transmission casing 23, power is transmitted from input shaft 24 to the drive shaft 25 through a reduction gearing having smaller and larger bevel gears 27 and 28. The transmission shaft 10 is adapted to be driven to rotate by the drive shaft 25 with a drive ratio selected from a plurality of drive ratios. A differential gearing 31 is provided which is powered from the transmission shaft 10 through meshing gears 29 and 30. Left and right axles 26 are composed of left and right output shafts of the differential gearing 31. A brake 32 located outside the transmission casing 23 is associated to the transmission shaft 10 for selectively braking the vehicle.

A key-shift transmission according to the present invention is arranged between the drive shaft 25 and transmission shaft 10. On the drive shaft 25 are fixedly mounted a plurality of drive gears $33F_1$, $33F_2$, $33F_3$, $33F_4$, $33F_5$ and $33F_6$ which are meshed, respectively, with corresponding speed-change gears $11F_1$, $11F_2$, $11F_3$, $11F_4$, $11F_5$ and $11F_6$ referred to before. These gears on the shafts 25 and 10 provide six forward direction speed-change trains. For a selective reverse drive of the vehicle with a low travelling speed, a backward direction speed-change train is provided which comprises a sprocket wheel 33R fixedly mounted on the drive shaft 25, a sprocket wheel 11R rotatably mounted on the transmission shaft 10, and a chain 34 entrained over the sprocket wheels 33R and 11R. On the transmission shaft 10 and between the sprocket wheel 11R and second-speed gear $11F_2$ is disposed a neutral-position collar 11N which has at its inner circumference an annular groove 35 for resting therein key-engaging lugs 13a of shift keys 13 at a neutral condition of the speed-change transmission. The first-speed gear $11F_1$ which is used or actuated only in particular cases is disposed at one end of the plurality of speed-change trains, whereas the second-speed to sixth-speed gears $11F_2$–$11F_6$ are disposed successively from a location adjacent to the neutral-position collar 11N towards the other end of the speed-change trains.

As shown in FIGS. 4 to 6, three shift keys 13 are provided and, correspondingly, the transmission shaft 10 is formed at the outer surface thereof with three elongated axial grooves 12 each of which has an open end at the left end face, as viewed in FIG. 1, of the shaft 10. As is usual, each of the speed-change gears 11F$_1$–11F$_6$ and sprocket wheel 11 R on the transmission shaft 10 is formed at the inner circumference thereof with recesses 37 into which gear-engaging lugs 13a of the shift keys may project so as to couple each of the gears 11F$_1$–11F$_6$ and sprocket wheel 11R to the shaft 10. Each of these recesses 37 is formed to have a circular width larger than that of each key 13 for an easy entering of the key-engaging lug 13a, as shown in FIG. 6 with respect to recesses 37 in the first-speed gear 11F$_1$.

As shown in FIGS. 2 to 5, connection of the shift keys 13 to the shift collar 14 as well as arrangement of coned disk springs 19 are made in the fashion detailed before. The first projection 16 of each shift key 13 has an arch-shaped outer end face. Each of the slots 14a in the shift collar 14 is formed, as shown in FIG. 3, to have an arch-shaped axial end surface extending between the inner and outer circumferences of shift collar. A radially inner end portion of such slot 14a is formed integrally with the slot 18a in the diameter-reduced cylindrical portion 18. The other portion of the slot 18a has an open end directed towards the disk springs 19. As shown in FIGS. 4 and 5, each of the slots 14a and 18a is formed for an easy machining in a fashion such that it extends throughout a diameter of the collar 14 or cylindrical portion 18. Each of bores formed to the shift collar 14 for fitting the pivot pins 15 has a cut-out end 36 for receiving a knocking tool when the pin 15 is fitted into the bore, as shown in FIG. 4.

In assembling the transmission shown, shift keys 13 are firstly assembled to the shift collar 14 together with disk springs 19 and ring 20 and then shift collar 14 is brought onto the transmission shaft 10 from the left, as viewed in FIG. 1, so as to insert the keys 13 into the elongated grooves 12 in the shaft 10.

A shifting operation is performed by a change lever (not shown) so as to displace the shift collar 14 through a shifter fork (not shown), extending at one end thereof into a fork-receiving annular groove 14b in the outer surface of shift collar, axially of the transmission shaft 10. Gear-engaging lugs 13a of the shift keys 13 operate to couple each of the speed-change gears 11F$_1$–11F$_6$ and sprocket wheel 11R corotatably to the transmission shaft 10 in a state where such lugs are projected into the recesses 37 shown.

We claim:

1. A key-shift transmission comprising: a transmission shaft having at its outer surface elongated axial grooves; a plurality of axially spaced speed-change gears rotatably mounted on said transmission shaft; shift keys slidably disposed within said axial grooves and having at free ends thereof gear-engaging lugs for coupling said speed-change gears one at a time to said transmission shaft; and a shift collar slidably mounted on said transmission shaft for shifting said shift keys axially of said shaft, each of said shift keys being connected at a base end portion thereof to said shift collar by a pin rotatably along a direction such that said gear-engaging lug thereof is moved radially of said transmission shaft, characterized in:

that each of said shift keys (13) is formed integrally at said base end portion thereof with an axially spaced shorter first projection (16) and taller second projection (17) which extend radially outwardly of said transmission shaft (10), said first projection being received in a slot (14a) formed to said shift collar (14) and being connected to said collar by said pin (15), and said second projection being faced to said shift collar from a direction opposite to said gear-engaging lug (13a); and that said shift collar (14) is formed integrally with a diameter-reduced cylindrical portion (18) extending axially towards said second projection (17) and including a slot (18a) which is continuous with said slot (14a) so as to permit said base end portion of said each shift key (13) to pass therethrough, coned disk spring means (19) being disposed on said cylindrical portion and between said shift collar and said second projection so as to bias said shift key (13) to rotate towards a direction such that said gear-engaging lug (13a) is projected radially outwardly of said transmission shaft (10).

2. A key-shift transmission as claimed in claim 1, wherein said shift keys (13) are disposed within said elongated axial grooves (12) in a fashion such that said keys are kept apart from bottom surfaces of said grooves.

3. A key-shift transmission as claimed in claim 1, wherein said second projection (17) extends radially outwardly of said transmission shaft (10) to a radial position substantially equal to that of the outer circumference of said shift collar (14), said disk spring means (19) being received by respective outer end portions of said shift collar and said second projection.

4. A key-shift transmission as claimed in claim 3, wherein the outer end portion of said second projection (17) includes a protrusion (17a) directed towards said shift collar (14) for receiving said disk spring means (19).

5. A key-shift transmission as claimed in claim 3, wherein the outer end portion of said second projection (17) includes a protrusion (17a) directed towards said shift collar (14), said disk spring means (19) being received by said protrusion through a ring (20) which is disposed on said cylindrical portion (18) and between said disk spring means and said second projection.

* * * * *